(12) United States Patent
Wu et al.

(10) Patent No.: US 10,571,017 B2
(45) Date of Patent: Feb. 25, 2020

(54) GEAR-SHIFTING CONTROL SYSTEM OF AUTOMATIC TRANSMISSION

(71) Applicant: Guangzhou Automobile Group Co., Ltd., Guangzhou, Guangdong Province (CN)

(72) Inventors: Jian Wu, Guangzhou (CN); Fan Mo, Guangzhou (CN); Xinzhi Huang, Guangzhou (CN); Xuewu Liu, Guangzhou (CN); Anwei Zhang, Guangzhou (CN)

(73) Assignee: GUANGZHOU AUTOMOBILE GROUP CO., LTD., Guangzhou, Guangdong Province (CN)

( * ) Notice: Subject to any disclaimer, the term of this patent is extended or adjusted under 35 U.S.C. 154(b) by 222 days.

(21) Appl. No.: 15/527,708

(22) PCT Filed: Nov. 4, 2015

(86) PCT No.: PCT/CN2015/093782
§ 371 (c)(1),
(2) Date: May 17, 2017

(87) PCT Pub. No.: WO2016/078512
PCT Pub. Date: May 26, 2016

(65) Prior Publication Data
US 2019/0093759 A1 Mar. 28, 2019

(30) Foreign Application Priority Data

Nov. 18, 2014 (CN) .......................... 2014 1 0657549
Nov. 18, 2014 (CN) .......................... 2014 1 0657662

(51) Int. Cl.
*F16H 61/02* (2006.01)
*F16H 1/12* (2006.01)
(Continued)

(52) U.S. Cl.
CPC ......... *F16H 61/0211* (2013.01); *F16H 61/12* (2013.01); *F16H 61/688* (2013.01); *F16H 2200/0056* (2013.01)

(58) Field of Classification Search
None
See application file for complete search history.

(56) References Cited

U.S. PATENT DOCUMENTS 8,567,274 B2 * 10/2013 Brandenburg ........ F16H 61/688
74/330
2006/0046897 A1 3/2006 Mohlmann et al.
(Continued)

FOREIGN PATENT DOCUMENTS

CN 101725705 A 6/2010
CN 102168754 A 8/2011
(Continued)

*Primary Examiner* — Mark A Manley
(74) *Attorney, Agent, or Firm* — Cheng-Ju Chiang

(57) ABSTRACT

A gear-shifting control system of an automatic transmission includes a main pump, four gear-shifting cylinders, a gear-shifting control valve, a first gear switching valve, a second gear switching valve, a first gear on-off valve, and a second gear on-off valve. The gear-shifting control valve has an inlet and two outlets, the first gear switching valve has two inlets and four outlets, the second gear switching valve has two inlets and four outlets. The first gear on-off valve is connected between the first gear switching valve and the gear-shifting control valve, to disconnect or connect the gear-shifting control valve and the first gear switching valve. The second gear on-off valve is connected between the second gear switching valve and the gear-shifting control valve, to disconnect or connect the gear-shifting control valve and the second gear switching valve. The four outlets of the first gear switching valve and the four outlets of the second gear switching valve are connected with the four gear-shifting cylinders.

9 Claims, 1 Drawing Sheet

(51) Int. Cl.
*F16H 61/688* (2006.01)
*F16H 61/12* (2010.01)

(56) References Cited

U.S. PATENT DOCUMENTS

| | | | | |
|---|---|---|---|---|
| 2006/0101933 A1* | 5/2006 | Koenig | ............... | F16H 61/12 |
| | | | | 74/333 |
| 2007/0028708 A1* | 2/2007 | Futamura | ............ | F16H 61/0206 |
| | | | | 74/335 |
| 2010/0096232 A1* | 4/2010 | Buchanan | ............... | F16D 23/06 |
| | | | | 192/3.61 |
| 2012/0304815 A1* | 12/2012 | Yagi | ................... | F16H 61/0206 |
| | | | | 74/664 |

FOREIGN PATENT DOCUMENTS

| | | |
|---|---|---|
| CN | 102230534 A | 11/2011 |
| CN | 102884343 A | 1/2013 |
| CN | 103363101 A | 10/2013 |
| CN | 204312689 U | 5/2015 |
| CN | 204312690 U | 5/2015 |
| DE | 102006016397 A1 | 10/2007 |
| DE | 102010032657 A1 | 2/2011 |
| JP | S62-127562 A | 6/1987 |

\* cited by examiner

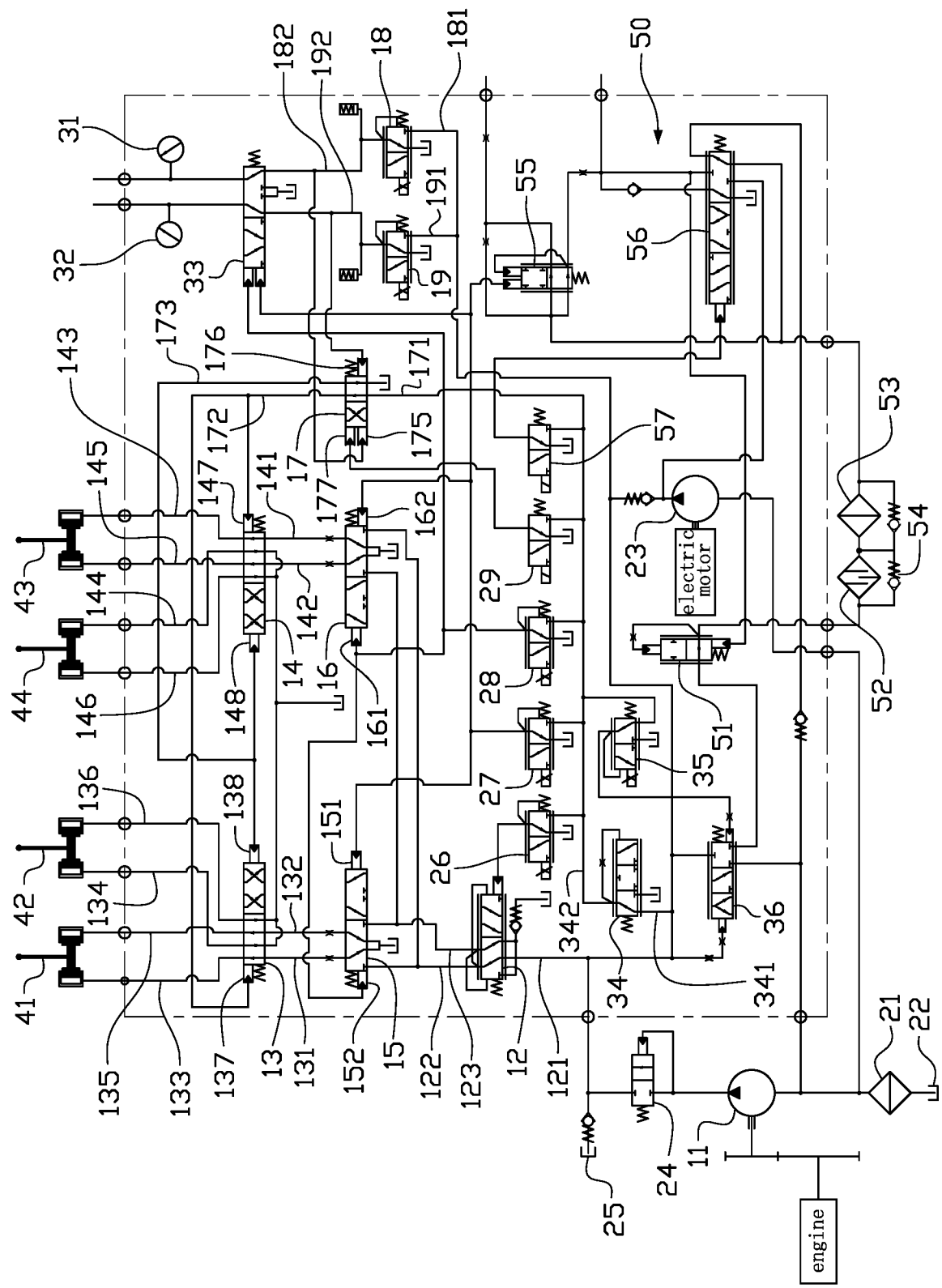

GEAR-SHIFTING CONTROL SYSTEM OF AUTOMATIC TRANSMISSION

CROSS-REFERENCE TO RELATED APPLICATION

This application is a 35 U.S.C. § 371 National Phase conversion of International (PCT) Patent Application No. PCT/CN2015/093782, filed on Nov. 4, 2015, which claims the priority of Chinese Patent Application No. 201410657662.6, filed by Guangzhou Automobile Group Co., Ltd. on Nov. 18, 2014, and entitled as "gear-shifting control system of automatic transmission". The contents of the above-identified application are incorporated herein by reference. This PCT application further claims the priority of Chinese Patent Application No. 201410657549.8, filed by Guangzhou Automobile Group Co., Ltd. on Nov. 18, 2014, and entitled as "gear-shifting control system of automatic transmission". The contents of the above-identified application are also incorporated herein by reference. The PCT International Patent Application was filed and published in Chinese.

TECHNICAL FIELD

The present application relates to automatic transmission of vehicle, and more particularly to a gear-shifting control system of an automatic transmission.

BACKGROUND

With the development of science and technology, the way of shifting gears for vehicle is gradually changing from manual gear shifting to automatic gear shifting. The automatic gear shifting is achieved by automatic transmission, wherein dual clutch automatic transmission has been welcomed by the market due to its high transmission efficiency. The dual clutch automatic transmission adopts two clutches, one clutch is used to control the odd gears, and the other one is used to control the even gears. Through the automatic switching between the two clutches, the gear shifting is achieved and can be realized under load, i.e., the power is not interrupted during the gear shifting, to improve the comfort of the vehicle.

When an automatic transmission is realizing automatic gear shifting, a system component, i.e., shift actuator, is required for achieving the automatic gear shifting. At present, the hydraulic shift actuator is commonly used. Gear shifting is usually realized by synchronizers, which are connected to, and rotated with, a corresponding shaft. One side or two sides of the synchronizer is provided with gears having different gear ratios. Under the action of the shift executor, the synchronizer is driven to move axially and be engaged with a neighboring gear, such that the gear is coupled to the shaft, realizing the synchronization of the gear and the shaft, to thereby output power.

Currently, the automatic transmission generally provides eight gears (including the reverse gear), a gear-shifting control system is used to control the shift actuator to realize the gear shifting of the eight gears. In prior art, in order to realize the gearshift control and the safety control of the automatic transmission, the gear-shifting control system ordinary uses a large number of slide valves and solenoid valves, the system becomes complicated and the drive control efficiency is low. Furthermore, in prior art, when a clutch responsible for odd gears (or even gears) is in working state, it is unable to prohibit the operation of odd gears (or even gears), which may result in misoperation when the transmission runs, to cause damage to the transmission.

SUMMARY

In view of the above, it is necessary to provide a gear-shifting control system of an automatic transmission, to realize the gearshift control and the safety control of the automatic transmission with a minimal number of slide valves and solenoid valves.

In another aspect, it is also necessary to provide a gear-shifting control system of an automatic transmission, to realize the purpose of prohibiting the operation of odd gears (or even gears) when a clutch responsible for odd gears (or even gears) is in working state, thereby avoiding misoperation and damage to the automatic transmission.

In an embodiment, the present application provides a gear-shifting control system of an automatic transmission. The gear-shifting control system includes a main pump and four gear-shifting cylinders, the gear-shifting control system further includes:

a gear-shifting control valve, the gear-shifting control valve has an inlet and two outlets, the gear-shifting control valve can switch between a first working position and a second working position, when the gear-shifting control valve is in the first working position, the inlet is in fluid communication with one of the two outlets, when the gear-shifting control valve is in the second working position, the inlet is in fluid communication with the other one of the two outlets;

a first gear switching valve, the first gear switching valve has two inlets and four outlets, the first gear switching valve can switch between a first working position and a second working position, when the first gear switching valve is in the first working position, the two inlets of the first gear switching valve are respectively in fluid communication with two of the four outlets of the first gear switching valve, when the first gear switching valve is in the second working position, the two inlets of the first gear switching valve are respectively in fluid communication with the other two of the four outlets of the first gear switching valve;

a second gear switching valve, the second gear switching valve has two inlets and four outlets, the second gear switching valve can switch between a first working position and a second working position, when the second gear switching valve is in the first working position, the two inlets of the second gear switching valve are respectively in fluid communication with two of the four outlets of the second gear switching valve, when the second gear switching valve is in the second working position, the two inlets of the second gear switching valve are respectively in fluid communication with the other two of the four outlets of the second gear switching valve;

a first gear on-off valve, the first gear on-off valve is connected between the first gear switching valve and the gear-shifting control valve, the first gear on-off valve can switch between a closed position and an opened position, when the first gear on-off valve is in the closed position, the two outlets of the gear-shifting control valve are respectively isolated from the two inlets of the first gear switching valve, when the first gear on-off valve is in the opened position, the two outlets of the gear-shifting control valve are respectively in fluid communication with the two inlets of the first gear switching valve; and a second gear on-off valve, the second gear on-off valve is connected between the second gear switching valve and the gear-shifting control valve, the second gear on-off valve can switch between a closed position and an opened position, when the second gear on-off valve is in the closed position, the two outlets of the gear-shifting control valve are respectively isolated from the two inlets of the second gear switching valve, when the second gear on-off valve is in the opened position, the two outlets of the gear-shifting control valve are respectively in fluid communication with the two inlets of the second gear switching valve;

the four outlets of the first gear switching valve are connected with two of the four gear-shifting cylinders, the four outlets of the second gear switching valve are connected with the other two of the four gear-shifting cylinders.

In another embodiment, the present application provides a gear-shifting control system of an automatic transmission. The gear-shifting control system includes a main pump and four gear-shifting cylinders, the gear-shifting control system further includes:

a first gear switching valve, the first gear switching valve has two inlets, four outlets, a first control end, and a second control end, the first control end and the second control end of the first gear switching valve are respectively located at two ends of the first gear switching valve, the first gear switching valve can switch between a first working position and a second working position, when the first gear switching valve is in the first working position, the two inlets of the first gear switching valve are respectively in fluid communication with two of the four outlets of the first gear switching valve, when the first gear switching valve is in the second working position, the two inlets of the first gear switching valve are respectively in fluid communication with the other two of the four outlets of the first gear switching valve;

a second gear switching valve, the second gear switching valve has two inlets, four outlets, a first control end, and a second control end, the first control end and the second control end of the second gear switching valve are respectively located at two ends of the second gear switching valve, the second gear switching valve can switch between a first working position and a second working position, when the second gear switching valve is in the first working position, the two inlets of the second gear switching valve are respectively in fluid communication with two of the four outlets of the second gear switching valve, when the second gear switching valve is in the second working position, the two inlets of the second gear switching valve are respectively in fluid communication with the other two of the four outlets of the second gear switching valve;

an odd-even selecting valve, the odd-even selecting valve has an inlet, a first outlet, a second outlet, a first control end, and a second control end, the first control end and the second control end of the odd-even selecting valve are respectively located at two ends of the odd-even selecting valve, the first outlet of the odd-even selecting valve is connected with the first control end of the first gear switching valve and the first control end of the second gear switching valve, the second outlet of the odd-even selecting valve is connected with the second control end of the first gear switching valve and the second control end of the second gear switching valve; the odd-even selecting valve can switch between a first working position and a second working position, when the odd-even selecting valve is in the first working position, the inlet of the odd-even selecting valve is in fluid communication with the first outlet of the odd-even selecting valve, when the odd-even selecting valve is in the second working position, the inlet of the odd-even selecting valve is in fluid communication with the second outlet of the odd-even selecting valve;

a first clutch solenoid valve, the first clutch solenoid valve is used for controlling the engagement of a first clutch, the first clutch solenoid valve has an inlet and an outlet, the outlet of the first clutch solenoid valve is connected with the first control end of the odd-even selecting valve;

a second clutch solenoid valve, the second clutch solenoid valve is used for controlling the engagement of a second clutch, the second clutch solenoid valve has an inlet and an outlet, the outlet of the second clutch solenoid valve is connected with the second control end of the odd-even selecting valve;

the four outlets of the first gear switching valve are connected with two of the four gear-shifting cylinders, the four outlets of the second gear switching valve are connected with the other two of the four gear-shifting cylinders.

In the embodiments of the present application, through control to the gear-shifting control valve, the first gear switching valve, the second gear switching valve, the first gear on-off valve and the second gear on-off valve of the gear-shifting control system, it can achieve the gear shifting for an automatic transmission with eight gears (seven forward gears and one reverse gear). The number of components in the system is greatly reduced, to realize the gearshift control and the safety control of the automatic transmission with a minimal number of slide valves and solenoid valves. The system is simple and the drive control is more effective.

In the embodiments of the present application, through control to the first gear switching valve, the second gear switching valve, the odd-even selecting valve, the first clutch solenoid valve and the second clutch solenoid valve of the gear-shifting control system, it can achieve the purpose of prohibiting the operation of odd gears (or even gears) when a clutch responsible for odd gears (or even gears) is in working state, thereby avoiding misoperation and damage to the automatic transmission. The security and robustness of the system is improved.

BRIEF DESCRIPTION OF THE DRAWINGS

FIG. 1 is a schematic diagram of a gear-shifting control system of an automatic transmission according to an embodiment of the present application.

DETAILED DESCRIPTION OF PREFERRED EMBODIMENTS

In order to make the purposes, characteristics, and advantages of the present application more apparently, embodiments of the present application will now be described in more detail with reference to the drawing figures.

FIG. 1 is a schematic diagram of a gear-shifting control system of an automatic transmission according to an embodiment of the present application. With reference to FIG. 1, the gear-shifting control system is used in an automatic transmission of vehicle, especially in a dual clutch automatic transmission. The gear-shifting control system includes a main pump 11, a gear-shifting control valve 12, a first gear switching valve 13, a second gear switching valve 14, a first gear on-off valve 15, a second gear on-off valve 16, an odd-even selecting valve 17, a first clutch solenoid valve 18, and a second clutch solenoid valve 19.

The main pump 11 draws oil from an oil tank 22 through an oil filter 21, to provide hydraulic oil for the gear-shifting control system. In the embodiment, the main pump 11 is driven by an engine of the vehicle. The gear-shifting control system is further provided with an auxiliary pump 23, the auxiliary pump 23 is driven by an electric motor. On one hand, the auxiliary pump 23 can be used to assist the main pump 11 when the hydraulic oil provided by the main pump 11 is not sufficient; on the other hand, the auxiliary pump 23 can ensure the supply of hydraulic oil for the system when the engine stops and accordingly the main pump 11 stops. The auxiliary pump 23 also draws oil from the oil tank 22 through the oil filter 21. In FIG. 1, the oil tank symbol appears in different places. These oil tank symbols should be understood that it is connected to the oil tank 22 via a corresponding pipeline.

In order to prevent the hydraulic oil flowing reversely, a main pump one-way valve 24 is connected to the outlet of the main pump 11. In the embodiment, the main pump one-way valve 24 is a hydraulically controlled one-way valve, the hydraulic oil outputted by the main pump 11 is fed back to a control end of the main pump one-way valve 24, to resist the spring provided at the spring end. Only when the output pressure of the main pump 11 overcomes the spring force, the main pump one-way valve 24 switches from a closed position of FIG. 1 to an opened position. That is, so long as there is not enough pressure established by the main pump 11, the main pump one-way valve 24 isolates the main pump 11 from the rest of the gear-shifting control system. On one hand, the main pump one-way valve 24 is used for stopping the hydraulic oil from flowing in the direction towards the main pump 11; on the other hand, the main pump one-way valve 24 ensures the main pump 11 with necessary starting characteristics. It is understood that, the main pump one-way valve 24 may also be an ordinary one-way valve.

In order to control a maximal pressure of the system, the outlet of the main pump one-way valve 24 is further connected with a system security valve 25. The system security valve 25 may be a pressure relief valve or an ordinary one-way valve. In the embodiment, the system security valve 25 is an ordinary one-way valve, which is connected between the outlet and the oil tank 22. The inlet of the one-way valve is connected to the outlet of the main pump one-way valve 24, and the outlet of the one-way valve is connected to the oil tank 22. An allowed maximal pressure is set by the one-way valve in the system. When the pressure of the system exceeds the allowed maximal pressure, the one-way valve is opened for bleeding off oil.

The gear-shifting control valve 12 has an inlet 121 and two outlets 122, 123 (hereinafter as first outlet 122 and second outlet 123). The inlet 121 of the gear-shifting control valve 12 is connected to the main pump 11 through the main pump one-way valve 24. The gear-shifting control valve 12 can switch between a first working position and a second working position. When the gear-shifting control valve 12 is in the first working position, the inlet 121 is in fluid communication with one of the two outlets 122, 123. When the gear-shifting control valve 12 is in the second working position, the inlet 121 is in fluid communication with the other one of the two outlets 122, 123. In the embodiment, when the gear-shifting control valve 12 is in the first working position (the left position as shown in FIG. 1), the inlet 121 is in fluid communication with the first outlet 122, the second outlet 123 is in fluid communication with the oil tank 22; when the gear-shifting control valve 12 is switched to the second working position (the right position as shown in FIG. 1), the inlet 121 is in fluid communication with the second outlet 123, the first outlet 122 is in fluid communication with the oil tank 22. That is, through changing the working positions of the gear-shifting control valve 12, the pressurized hydraulic oil of the main pump 11 can be selectively guided to one of the two outlets 122, 123.

The gear-shifting control valve 12 may be a solenoid direction valve or a hydraulically controlled direction valve of the slide type. When the gear-shifting control valve 12 is a solenoid direction valve, switching of the gear-shifting control valve 12 can be achieved by simply controlling gain and loss of electricity. When shifting between different gears, the required gear-shifting pressure is usually different. In the embodiment, in order to cause the gear-shifting pressure outputted by the two outlets 122, 123 to satisfy the shifting requirements for different gears, the gear-shifting control valve 12 adopts a hydraulically controlled proportional direction valve of the slide type. The gear-shifting control system further includes a shifting pressure solenoid valve 26, the outlet of the shifting pressure solenoid valve 26 is connected with a control end of the gear-shifting control valve 12. When the shifting pressure solenoid valve 26 is opened, the control pressure outputted by the shifting pressure solenoid valve 26 acts on the control end of the gear-shifting control valve 12, to push the gear-shifting control valve 12 to move and switch. In addition, the two outlets 122, 123 of the gear-shifting control valve 12 feed back the pressure to the two ends of the gear-shifting control valve 12. Through the shifting pressure solenoid valve 26, it is achieved that the two outlets 122, 123 of the gear-shifting control valve 12 can output different gear-shifting pressures for different gears.

The first gear switching valve 13 has two inlets 131, 132 (hereinafter as first inlet 131 and second inlet 132) and four outlets 133, 134, 135, 136 (hereinafter as first outlet 133, second outlet 134, third outlet 135, and fourth outlet 136). The first gear switching valve 13 can switch between a first working position and a second working position. When the first gear switching valve 13 is in the first working position, the two inlets 131, 132 are respectively in fluid communication with two of the four outlets 133, 134, 135, 136. When the first gear switching valve 13 is in the second working position, the two inlets 131, 132 are respectively in fluid communication with the other two of the four outlets 133, 134, 135, 136. In the embodiment, when the first gear switching valve 13 is in the first working position (the left position as shown in FIG. 1), the two inlets 131, 132 are respectively in fluid communication with the first outlet 133 and the third outlet 135, the second outlet 134 and the fourth outlet 136 are in fluid communication with the oil tank 22; when the first gear switching valve 13 is in the second working position (the right position as shown in FIG. 1), the two inlets 131, 132 are respectively in fluid communication with the second outlet 134 and fourth outlet 136, the first outlet 133 and third outlet 135 are in fluid communication with the oil tank 22. That is, through changing the working positions of the first gear switching valve 13, the first inlet 131 is selectively enabled to connect fluidically with either the first outlet 133 or the second outlet 134, and the second inlet 132 is selectively enabled to connect fluidically with either the third outlet 135 or fourth outlet 136.

The second gear switching valve 14 has two inlets 141, 142 (hereinafter as first inlet 141 and second inlet 142) and four outlets 143, 144, 145, 146 (hereinafter as first outlet 143, second outlet 144, third outlet 145, and fourth outlet 146). The second gear switching valve 14 can switch between a first working position and a second working position. When the second gear switching valve 14 is in the first working position, the two inlets 141, 142 are respectively in fluid communication with two of the four outlets 143, 144, 145, 146. When the second gear switching valve 14 is in the second working position, the two inlets 141, 142 are respectively in fluid communication with the other two of the four outlets 143, 144, 145, 146. In the embodiment, when the second gear switching valve 14 is in the first working position (the right position as shown in FIG. 1), the two inlets 141, 142 are respectively in fluid communication with the first outlet 143 and third outlet 145, the second outlet 144 and the fourth outlet 146 are in fluid communication with the oil tank 22; when the second gear switching valve 14 is in the second working position (the left position as shown in FIG. 1), the two inlets 141, 142 are respectively in fluid communication with the second outlet 144 and the fourth outlet 146, the first outlet 143 and the third outlet 145 are in fluid communication with the oil tank 22. That is, through changing the working positions of the second gear switching valve 14, the first inlet 141 is selectively enabled to connect fluidically with either the first outlet 143 or the second outlet 144, and the second inlet 142 is selectively enabled to connect fluidically with either the third outlet 145 or the fourth outlet 146.

The first gear on-off valve 15 is connected between the first gear switching valve 13 and the gear-shifting control valve 12. The first gear on-off valve 15 can switch between a closed position and an opened position. When the first gear on-off valve 15 is in the closed position, the two outlets 122, 123 of the gear-shifting control valve 12 are respectively isolated from the two inlets 131, 132 of the first gear switching valve 13; when the first gear on-off valve 15 is in the opened position, the two outlets 122, 123 of the gear-shifting control valve 12 are respectively in fluid communication with the two inlets 131, 132 of the first gear switching valve 13. In the embodiment, when the first gear on-off valve 15 is in the closed position (the left position as shown in FIG. 1), the two outlets 122, 123 of the gear-shifting control valve 12 are cut off at the first gear on-off valve 15, the two inlets 131, 132 of the first gear switching valve 13 are in fluid communication with the oil tank 22 through the first gear on-off valve 15, such that the two outlets 122, 123 of the gear-shifting control valve 12 are isolated from the two inlets 131, 132 of the first gear switching valve 13; when the first gear on-off valve 15 is in the opened position (the right position as shown in FIG. 1), the two outlets 122, 123 of the gear-shifting control valve 12 are respectively in fluid communication with the two inlets 131, 132 of the first gear switching valve 13.

The second gear on-off valve 16 is connected between the second gear switching valve 14 and the gear-shifting control valve 12. The second gear on-off valve 16 can switch between a closed position and an opened position. When the second gear on-off valve 16 is in the closed position, the two outlets 122, 123 of the gear-shifting control valve 12 are respectively isolated from the two inlets 141, 142 of the second gear switching valve 14; when the second gear on-off valve 16 is in the opened position, the two outlets 122, 123 of the gear-shifting control valve 12 are respectively in fluid communication with the two inlets 141, 142 of the second gear switching valve 14. In the embodiment, when the second gear on-off valve 16 is in the closed position (the right position as shown in FIG. 1), the two outlets 122, 123 of the gear-shifting control valve 12 are cut off at the second gear on-off valve 16, the two inlets 141, 142 of the second gear switching valve 14 are in fluid communication with the oil tank 22 through the second gear on-off valve 16, such that the two outlets 122, 123 of the gear-shifting control valve 12 are isolated from the two inlets 141, 142 of the second gear switching valve 14; when the second gear on-off valve 16 is in the opened position (the left position as shown in FIG. 1), the two outlets 122, 123 of the gear-shifting control valve 12 are respectively in fluid communication with the two inlets 141, 142 of the second gear switching valve 14.

The first gear on-off valve 15 and the second gear on-off valve 16 specifically may be a solenoid direction valve or a hydraulically controlled direction valve of the slide type. When the first gear on-off valve 15 and the second gear on-off valve 16 are solenoid direction valves, switching of the first gear on-off valve 15 and the second gear on-off valve 16 can be achieved by simply controlling gain and loss of electricity. In the embodiment, the first gear on-off valve 15 and the second gear on-off valve 16 are hydraulically controlled direction valves of the slide type. The gear-shifting control system further includes a first gear solenoid valve 27 and a second gear solenoid valve 28. The first gear solenoid valve 27 and the second gear solenoid valve 28 specifically may be proportional solenoid valve. The first gear solenoid valve 27 can output an adjustable first gear-shifting control pressure, the second gear solenoid valve 28 can output an adjustable second gear-shifting control pressure, wherein the first gear-shifting control pressure acts on an opening end 151 of the first gear on-off valve 15 and a closing end 162 of the second gear on-off valve 16, and the second gear-shifting control pressure acts on an opening end 161 of the second gear on-off valve 16 and a closing end 152 of the first gear on-off valve 15, such that the two gear on-off valves 15, 16 can control the gear shifting through the first gear-shifting control pressure and the second gear-shifting control pressure, and can achieve the effect of interlock, to improve the security of the system. That is, when the first gear-shifting control pressure outputted by the first gear solenoid valve 27 drives the first gear on-off valve 15 to stay in the opened position, the first gear-shifting control pressure will meanwhile drive the second gear on-off valve 16 to stay in the closed position; when the second gear-shifting control pressure outputted by the second gear solenoid valve 28 drives the second gear on-off valve 16 to stay in the opened position, the second gear-shifting control pressure will meanwhile drive the first gear on-off valve 15 to stay in the closed position. In addition, a spring is further provided at the closing end 152 of the first gear on-off valve 15 and the closing end 162 of the second gear on-off valve 16, the two gear on-off valves 15, 16 return to their initial states under the action of the spring after the system is shutdown.

The first gear switching valve 13 and the second gear switching valve 14 specifically may be a solenoid direction valve or a hydraulically controlled direction valve of the slide type. When the first gear switching valve 13 and the second gear switching valve 14 are solenoid direction valves, switching of the first gear switching valve 13 and the second gear switching valve 14 can be achieved by simply controlling gain and loss of electricity. In the embodiment, the first gear switching valve 13 and the second gear switching valve 14 are hydraulically controlled direction valves of the slide type. The first gear switching valve 13 further has a first control end 137 and a second control end 138, the first control end 137 and the second control end 138 are respectively located at two ends of the first gear switching valve 13. The second gear switching valve 14 further has a first control end 147 and a second control end 148, the first control end 147 and the second control end 148 are respectively located at two ends of the second gear switching valve 14. The first control end 137 of the first gear switching valve 13 and the first control end 147 of the second gear switching valve 14 are connected together and connected to a hydraulic control line, the second control end 138 of the first gear switching valve 13 and the second control end 148 of the second gear switching valve 14 are connected together and connected to another hydraulic control line.

The gear-shifting control system further includes four gear-shifting cylinders 41, 42, 43, 44 (hereinafter as first gear-shifting cylinder 41, second gear-shifting cylinder 42, third gear-shifting cylinder 43, and fourth gear-shifting cylinder 44). The four outlets 133, 134, 135, 136 of the first gear switching valve 13 are connected with two of the four gear-shifting cylinders 41, 42, 43, 44, the four outlets 143, 144, 145, 146 of the second gear switching valve 14 are connected with the other two of the four gear-shifting cylinders 41, 42, 43, 44. In the embodiment, the four outlets 133, 134, 135, 136 of the first gear switching valve 13 are connected with the first gear-shifting cylinder 41 and the second gear-shifting cylinder 42, the four outlets 143, 144, 145, 146 of the second gear switching valve 14 are connected with the third gear-shifting cylinder 43 and the fourth gear-shifting cylinder 44. The first outlet 133 and the third outlet 135 of the first gear switching valve 13 are respectively connected with two ends of the first gear-shifting cylinder 41. The second outlet 134 and the fourth outlet 136 of the first gear switching valve 13 are respectively connected with two ends of the second gear-shifting cylinder 42. The first outlet 143 and the third outlet 145 of the second gear switching valve 14 are respectively connected with two ends of the third gear-shifting cylinder 43. The second outlet 144 and the fourth outlet 146 of the second gear switching valve 14 are respectively connected with two ends of the fourth gear-shifting cylinder 44. Each gear-shifting cylinder is used for driving a corresponding shift fork to move, for achieving gear-shifting engagement or disengagement of two gears. For example, the first gear-shifting cylinder 41 can be used for controlling the $3^{rd}$ gear and the $7^{th}$ gear, the second gear-shifting cylinder 42 can be used for controlling the R gear and the $6^{th}$ gear, the third gear-shifting cylinder 43 can be used for controlling the $1^{st}$ gear and the $5^{th}$ gear, and the fourth gear-shifting cylinder 44 can be used for controlling the $2^{nd}$ gear and the $4^{th}$ gear. Thus, through control to the gear-shifting control valve 12, the first gear switching valve 13, the second gear switching valve 14, the first gear on-off valve 15 and the second gear on-off valve 16 of the gear-shifting control system, it can achieve the gear shifting for an automatic transmission with eight gears (seven forward gears and one reverse gear). The number of components in the system is greatly reduced, to realize the gearshift control and the safety control of the automatic transmission with a minimal number of slide valves and solenoid valves. The system is simple and the drive control is more effective.

The odd-even selecting valve 17 has an inlet 171, a first outlet 172, and a second outlet 173. The first outlet 172 is connected with the first control end 137 of the first gear switching valve 13 and the first control end 147 of the second gear switching valve 14. The second outlet 173 is connected with the second control end 138 of the first gear switching valve 13 and the second control end 148 of the second gear switching valve 14. The odd-even selecting valve 17 can switch between a first working position and a second working position. When the odd-even selecting valve 17 is in the first working position, the inlet 171 is in fluid communication with the first outlet 172. When the odd-even selecting valve 17 is in the second working position, the inlet 171 is in fluid communication with the second outlet 173. In the embodiment, when the odd-even selecting valve 17 is in the first working position (the right position as shown in FIG. 1), the inlet 171 is in fluid communication with the first outlet 172, the second outlet 173 is in fluid communication with the oil tank 22; when the odd-even selecting valve 17 is switched to the second working position (the left position as shown in FIG. 1), the inlet 171 is in fluid communication with the second outlet 173, the first outlet 172 is in fluid communication with the oil tank 22.

In the embodiment, the odd-even selecting valve 17 is a hydraulically controlled direction valve of the slide type. The odd-even selecting valve 17 has a first control end 175 and a second control end 176. The first clutch solenoid valve 18 has an inlet 181 and an outlet 182. The outlet 182 of the first clutch solenoid valve 18 is connected with the first control end 175 of the odd-even selecting valve 17. When the first clutch solenoid valve 18 is opened, the inlet 181 is in fluid communication with the outlet 182, the control pressure outputted by the first clutch solenoid valve 18 acts on the first control end 175 of the odd-even selecting valve 17, to push the odd-even selecting valve 17 to switch to its second working position (the left position as shown in FIG. 1).

The second clutch solenoid valve 19 has an inlet 191 and an outlet 192. The outlet 192 of the second clutch solenoid valve 19 is connected with the second control end 176 of the odd-even selecting valve 17. When the second clutch solenoid valve 19 is opened, the inlet 191 is in fluid communication with the outlet 192, the control pressure outputted by the second clutch solenoid valve 19 acts on the second control end 176 of the odd-even selecting valve 17, to push the odd-even selecting valve 17 to switch to its first working position (the right position as shown in FIG. 1). The first clutch solenoid valve 18 is used for controlling the engagement of a first clutch (not shown), the second clutch solenoid valve 19 is used for controlling the engagement of a second clutch (not shown), the inlet 171 of the odd-even selecting valve 17, the inlet 181 of the first clutch solenoid valve 18 and the inlet 191 of the second clutch solenoid valve 19 are connected with the main pump 11.

When the first clutch solenoid valve 18 is opened, the odd-even selecting valve 17 is switched to its second working position (the left position as shown in FIG. 1). At this moment, the inlet 171 of the odd-even selecting valve 17 is in fluid communication with the second outlet 173, the odd-even selecting valve 17 applies a control pressure simultaneously to the second control end 138 of the first gear switching valve 13 and the second control end 148 of the second gear switching valve 14, causing the first gear switching valve 13 to switch to its second working position (the right position as shown in FIG. 1) at which the first inlet 131 and the second inlet 132 of the first gear switching valve 13 can only be in fluid communication with the second outlet 134 and the fourth outlet 136, and meanwhile, causing the second gear switching valve 14 to switch to its second working position (the left position as shown in FIG. 1) at which the first inlet 141 and the second inlet 142 of the second gear switching valve 14 can only be in fluid communication with the second outlet 144 and the fourth outlet 146. When the first clutch solenoid valve 18 is opened, the first clutch used to control odd gears is in the engaged working state, the dual clutch automatic transmission is operating on an odd gear, and thereafter, the next gear needing to be engaged will be an even gear. Therefore, through proper design of the gears, for example, if the second gear-shifting cylinder 42 connected with the second outlet 134 and the fourth outlet 136 of the first gear switching valve 13 and the fourth gear-shifting cylinder 44 connected with the second outlet 144 and the fourth outlet 146 of the second gear switching valve 14 are designed for controlling even gears, only even gears can be engaged through the first gear switching valve 13 and the second gear switching valve 14 when the first clutch solenoid valve 18 is opened, thereby realizing the purpose of prohibiting the operation of odd gears when the first clutch responsible for odd gears is in engagement.

When the second clutch solenoid valve 19 is opened, the odd-even selecting valve 17 is switched to its first working position (the right position as shown in FIG. 1). At this moment, the inlet 171 of the odd-even selecting valve 17 is in fluid communication with the first outlet 172, the odd-even selecting valve 17 applies a control pressure simultaneously to the first control end 137 of the first gear switching valve 13 and the first control end 147 of the second gear switching valve 14, causing the first gear switching valve 13 to switch to its first working position (the left position as shown in FIG. 1) at which the first inlet 131 and the second inlet 132 of the first gear switching valve 13 can only be in fluid communication with the first outlet 133 and the third outlet 135, and meanwhile, causing the second gear switching valve 14 to switch to its first working position (the right position as shown in FIG. 1) at which the first inlet 141 and the second inlet 142 of the second gear switching valve 14 can only be in fluid communication with the first outlet 143 and the third outlet 145. When the second clutch solenoid valve 19 is opened, the second clutch used to control even gears is in the engaged working state, the dual clutch automatic transmission is operating on an even gear, and thereafter, the next gear needing to be engaged will be an odd gear. Therefore, through proper design of the gears, for example, if the first gear-shifting cylinder 41 connected with the first outlet 133 and the third outlet 135 of the first gear switching valve 13 and the third gear-shifting cylinder 43 connected with the first outlet 143 and the third outlet 145 of the second gear switching valve 14 are designed for controlling odd gears, only odd gears can be engaged through the first gear switching valve 13 and the second gear switching valve 14 when the second clutch solenoid valve 19 is opened, thereby realizing the purpose of prohibiting the operation of even gears when the second clutch responsible for even gears is in engagement. That is, through control to the first gear switching valve 13, the second gear switching valve 14, the odd-even selecting valve 17, the first clutch solenoid valve 18 and the second clutch solenoid valve 19 of the gear-shifting control system, it can achieve the purpose of prohibiting the operation of odd gears (or even gears) when a clutch responsible for odd gears (or even gears) is in working state, thereby avoiding misoperation and damage to the automatic transmission. The security and robustness of the system is improved.

In order to cause the reverse gear to be engaged when both of the first clutch solenoid valve 18 and the second clutch solenoid valve 19 are closed, the odd-even selecting valve 17 further has a third control end 177, the third control end 177 and the first control end 175 are located at the same side of the odd-even selecting valve 17, the third control end 177 is connected with a first on-off solenoid valve 29, when the first on-off solenoid valve 29 is opened, the first on-off solenoid valve 29 outputs a control pressure acting on the third control end 177 of the odd-even selecting valve 17, to push the odd-even selecting valve 17 to switch to its second working position (the left position as shown in FIG. 1), such that the reverse gear can be selected.

In the embodiment, an odd-gear pressure sensor 31 is connected with the outlet 182 of the first clutch solenoid valve 18, for detecting the working pressure used to drive the first clutch; similarly, an even-gear pressure sensor 32 is connected with the outlet 192 of the second clutch solenoid valve 19, for detecting the working pressure used to drive the second clutch. When an abnormal pressure occurs in the pipeline connected with the clutches, in order to cut off the pipeline, a clutch cut-off valve 33 is connected with the outlet 182 of the first clutch solenoid valve 18 and the outlet 192 of the second clutch solenoid valve 19. The outlet of the first gear solenoid valve 27 and the outlet of the second gear solenoid valve 28 are further connected to the same control end of the clutch cut-off valve 33. When the first gear solenoid valve 27 and the second gear solenoid valve 28 are both opened, the control pressure outputted by the first gear solenoid valve 27 and the control pressure outputted by the second gear solenoid valve 28 are combined to push the clutch cut-off valve 33 to switch from its opened position (the right position as shown in FIG. 1) to its closed position (the left position as shown in FIG. 1), to thereby cut off the pipeline connected with the clutches.

In order to cause the control pressure applied to the various control ends of the gear-shifting control valve 12, the first gear switching valve 13, the second gear switching valve 14, the first gear on-off valve 15 and the second gear on-off valve 16 to be stable, so as to improve the stability of the various valves in operations, a pressure regulating valve 34 is further connected to the outlet of the main pump 11. The pressure regulating valve 34 is a proportional pressure relief valve of the slide type. The pressure regulating valve 34 has an inlet 341 and an outlet 342. The inlet 341 is connected with the main pump 11, the outlet 342 is connected with the inlets of the various solenoid valves 26, 27, 28, 29 and the odd-even selecting valve 17. The outlet 342 of the pressure regulating valve 34 further feeds its pressure back to one end of the pressure regulating valve 34, to resist the spring provided at the other end of the pressure regulating valve 34. Thus, even if the output pressure of the main pump 11 fluctuates, the pressure outputted from the outlet 342 is always kept relatively stable after being regulated by the pressure regulating valve 34, such that the control pressure applied to the various control ends also becomes stable after the various solenoid valves 26, 27, 28, 29 and the odd-even selecting valve 17.

The gear-shifting control system further includes an oil pressure solenoid valve 35 and an oil pressure relief valve 36. The inlet of the oil pressure solenoid valve 35 is connected with the outlet 342 of the pressure regulating valve 34. The outlet of the oil pressure solenoid valve 35 is connected with the closing end of the oil pressure relief valve 36 (the closing end also has a spring). The oil pressure relief valve 36 has an inlet, a first outlet and a second outlet. The opening end (the end opposite to the closing end) and the inlet of the oil pressure relief valve 36 are both connected with the outlet of the main pump 11. The first outlet of the oil pressure relief valve 36 is connected with the inlet of the main pump 11. The second outlet of the oil pressure relief valve 36 leads to a lubricating and cooling system 50. The control pressure applied to the closing end of the oil pressure relief valve 36 can be changed through the oil pressure solenoid valve 35, to cause the oil pressure relief valve 36 to switch from a closed position to an opened position, such that a portion of hydraulic oil in the main pipeline can flow towards the lubricating and cooling system 50 through the oil pressure relief valve 36, to satisfy the requirements of cooling the hydraulic oil and lubricating relevant components.

The lubricating and cooling system 50 includes a pressure limiting valve 51, an oil cooler 52, a filter 53, a one-way valve 54, a low-flow control valve 55, a high-flow control valve 56, and a second on-off solenoid valve 57. The pressure limiting valve 51 is connected with the second outlet of the oil pressure relief valve 36. The pressure limiting valve 51 is used for restricting the hydraulic pressure of the lubricating and cooling system 50. The oil cooler 52 and the filter 53 are connected with the pressure limiting valve 51, for cooling and filtering the hydraulic oil. The one-way valve 54 is connected in parallel with the oil cooler 52 and the filter 53. The opening pressure for the one-way valve 54 is set relatively high, such that the hydraulic oil normally flows through the oil cooler 52 and the filter 53. Only when the oil cooler 52 and the filter 53 are blocked up, the hydraulic oil flows through the one-way valve 54 in a bypass manner. After being cooled and filtered, the hydraulic oil then flows through the low-flow control valve 55 and is assigned for lubricating components required to be lubricated, and excessive hydraulic oil may return back to the oil tank 22 through the high-flow control valve 56. When the lubrication needs a large flow of hydraulic oil, the second on-off solenoid valve 57 can be used to turn on the high-flow control valve 56. The second on-off solenoid valve 57 has an inlet and outlet, the inlet of the second on-off solenoid valve 57 is connected with the outlet of the pressure regulating valve 34, the outlet of the second on-off solenoid valve 57 is connected with the control end of the high-flow control valve 56, such that the high-flow control valve 56 can be pushed to move and switch by the second on-off solenoid valve 57, to thereby open the high-flow control valve 56.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

INDUSTRIAL APPLICABILITY

In the embodiment, through control to the gear-shifting control valve, the first gear switching valve, the second gear switching valve, the first gear on-off valve and the second gear on-off valve of the gear-shifting control system, it can achieve the gear shifting for an automatic transmission with eight gears (seven forward gears and one reverse gear). The number of components in the system is greatly reduced, to realize the gearshift control and the safety control of the automatic transmission with a minimal number of slide valves and solenoid valves. The system is simple and the drive control is more effective. Through control to the first gear switching valve, the second gear switching valve, the odd-even selecting valve, the first clutch solenoid valve and the second clutch solenoid valve of the gear-shifting control system, it can achieve the purpose of prohibiting the operation of odd gears (or even gears) when a clutch responsible for odd gears (or even gears) is in working state, thereby avoiding misoperation and damage to the automatic transmission. The security and robustness of the system is improved.

What is claimed is:
1. A gear-shifting control system of an automatic transmission, comprising a main pump and four gear-shifting cylinders, wherein the gear-shifting control system further comprises:

a gear-shifting control valve, the gear-shifting control valve has an inlet and two outlets, the gear-shifting control valve can switch between a first working position and a second working position, when the gear-shifting control valve is in the first working position, the inlet is in fluid communication with one of the two outlets, when the gear-shifting control valve is in the second working position, the inlet is in fluid communication with the other one of the two outlets;
a first gear switching valve, the first gear switching valve has two inlets, four outlets, a first control end, and a second control end, the first control end and the second control end of the first gear switching valve are respectively located at two ends of the first gear switching valve, the first gear switching valve can switch between a first working position and a second working position, when the first gear switching valve is in the first working position, the two inlets of the first gear switching valve are respectively in fluid communication with two of the four outlets of the first gear switching valve, when the first gear switching valve is in the second working position, the two inlets of the first gear switching valve are respectively in fluid communication with the other two of the four outlets of the first gear switching valve;
a second gear switching valve, the second gear switching valve has two inlets, four outlets, a first control end and a second control end, the first control end and the second control end of the second gear switching valve are respectively located at two ends of the second gear switching valve, the second gear switching valve can switch between a first working position and a second working position, when the second gear switching valve is in the first working position, the two inlets of the second gear switching valve are respectively in fluid communication with two of the four outlets of the second gear switching valve, when the second gear switching valve is in the second working position, the two inlets of the second gear switching valve are respectively in fluid communication with the other two of the four outlets of the second gear switching valve;
a first gear on-off valve, the first gear on-off valve is connected between the first gear switching valve and the gear-shifting control valve, the first gear on-off valve can switch between a closed position and an opened position, when the first gear on-off valve is in the closed position, the two outlets of the gear-shifting control valve are respectively isolated from the two inlets of the first gear switching valve, when the first gear on-off valve is in the opened position, the two outlets of the gear-shifting control valve are respectively in fluid communication with the two inlets of the first gear switching valve;
a second gear on-off valve, the second gear on-off valve is connected between the second gear switching valve and the gear-shifting control valve, the second gear on-off valve can switch between a closed position and an opened position, when the second gear on-off valve is in the closed position, the two outlets of the gear-shifting control valve are respectively isolated from the two inlets of the second gear switching valve, when the second gear on-off valve is in the opened position, the two outlets of the gear-shifting control valve are respectively in fluid communication with the two inlets of the second gear switching valve;
an odd-even selecting valve, the odd-even selecting valve has an inlet, a first outlet, a second outlet, a first control end, and a second control end, the first control end and the second control end of the odd-even selecting valve are respectively located at two ends of the odd-even selecting valve, the first outlet of the odd-even selecting valve is connected with the first control end of the first gear switching valve and the first control end of the second gear switching valve, the second outlet of the odd-even selecting valve is connected with the second control end of the first gear switching valve and the second control end of the second gear switching valve; the odd-even selecting valve can switch between a first working position and a second working position, when the odd-even selecting valve is in the first working position, the inlet of the odd-even selecting valve is in fluid communication with the first outlet of the odd-even selecting valve, when the odd-even selecting valve is in the second working position, the inlet of the odd-even selecting valve is in fluid communication with the second outlet of the odd-even selecting valve;

a first clutch solenoid valve, the first clutch solenoid valve is used for controlling the engagement of a first clutch, the first clutch solenoid valve has an inlet and an outlet, the outlet of the first clutch solenoid valve is connected with the first control end of the odd-even selecting valve;

a second clutch solenoid valve, the second clutch solenoid valve is used for controlling the engagement of a second clutch, the second clutch solenoid valve has an inlet and an outlet, the outlet of the second clutch solenoid valve is connected with the second control end of the odd-even selecting valve;

the four outlets of the first gear switching valve are connected with two of the four gear-shifting cylinders, the four outlets of the second gear switching valve are connected with the other two of the four gear-shifting cylinders.

2. The gear-shifting control system of claim 1, wherein the gear-shifting control valve is a hydraulically controlled proportional direction valve of slide type, the gear-shifting control system further comprises a shifting pressure solenoid valve, an outlet of the shifting pressure solenoid valve is connected with a control end of the gear-shifting control valve, the two outlets of the gear-shifting control valve feed back the pressure to two ends of the gear-shifting control valve.

3. The gear-shifting control system of claim 2, wherein the gear-shifting control system further comprises a pressure regulating valve, the pressure regulating valve is a proportional pressure relief valve of slide type, the pressure regulating valve has an inlet and an outlet, the inlet of the pressure regulating valve is connected with an outlet of the main pump, the outlet of the pressure regulating valve is connected with the inlet of the shifting pressure solenoid valve.

4. The gear-shifting control system of claim 3, wherein the gear-shifting control system further comprises an oil pressure solenoid valve, an oil pressure relief valve, and a lubricating and cooling system, the oil pressure solenoid valve has an inlet and an outlet, the oil pressure relief valve has a closing end and an opening end, the main pump has an inlet and an outlet, the inlet of the oil pressure solenoid valve is connected with the outlet of the pressure regulating valve, the outlet of the oil pressure solenoid valve is connected with the closing end of the oil pressure relief valve; the oil pressure relief valve has an inlet, a first outlet, and a second outlet, the opening end and the inlet of the oil pressure relief valve are both connected with the outlet of the main pump, the first outlet of the oil pressure relief valve is connected with the inlet of the main pump, the second outlet of the oil pressure relief valve is connected with the lubricating and cooling system.

5. The gear-shifting control system of claim 1, wherein the first gear on-off valve and the second gear on-off valve are hydraulically controlled direction valves of slide type, the first gear on-off valve has an opening end and a closing end, the second gear on-off valve also has an opening end and a closing end the gear-shifting control system further comprises a first gear solenoid valve and a second gear solenoid valve, a control pressure outputted by the first gear solenoid valve acts on the opening end of the first gear on-off valve and the closing end of the second gear on-off valve, a control pressure outputted by the second gear solenoid valve acts on the closing end of the first gear on-off valve and the opening end of the second gear on-off valve.

6. The gear-shifting control system of claim 5, wherein a clutch cut-off valve is connected with the outlet of the first clutch solenoid valve and the outlet of the second clutch solenoid valve, the outlet of the first gear solenoid valve and the outlet of the second gear solenoid valve are further connected to the same control end of the clutch cut-off valve.

7. The gear-shifting control system of claim 1, wherein the four outlets of the first gear switching valve includes a first outlet, a second outlet, a third outlet, and a fourth outlet, when the first gear switching valve is in the first working position, the two inlets of the first gear switching valve are respectively in fluid communication with the first outlet and the third outlet of the first gear switching valve, when the first gear switching valve is in the second working position, the two inlets of the first gear switching valve are respectively in fluid communication with the second outlet and the fourth outlet of the first gear switching valve; the four outlets of the second gear switching valve includes a first outlet, a second outlet, a third outlet, and a fourth outlet, when the second gear switching valve is in the first working position, the two inlets of the second gear switching valve are respectively in fluid communication with the first outlet and the third outlet of the second gear switching valve, when the second gear switching valve is in the second working position, the two inlets of the second gear switching valve are respectively in fluid communication with the second outlet and the fourth outlet of the second gear switching valve.

8. The gear-shifting control system of claim 7, wherein the four gear-shifting cylinders includes a first gear-shifting cylinder, a second gear-shifting cylinder, a third gear-shifting cylinder, and a fourth gear-shifting cylinder, the first outlet and the third outlet of the first gear switching valve are respectively connected with two ends of the first gear-shifting cylinder, the second outlet and the fourth outlet of the first gear switching valve are respectively connected with two ends of the second gear-shifting cylinder, the first outlet and the third outlet of the second gear switching valve are respectively connected with two ends of the third gear-shifting cylinder, the second outlet and the fourth outlet of the second gear switching valve are respectively connected with two ends of the fourth gear-shifting cylinder.

9. The gear-shifting control system of claim 1, wherein the odd-even selecting valve further has a third control end, the third control end of the odd-even selecting valve and the first control end of the odd-even selecting valve are located at the same side of the odd-even selecting valve, the third control end of the odd-even selecting valve is connected with a first on-off solenoid valve, the first on-off solenoid valve outputs a control pressure acting on the third control end of the odd-even selecting valve.

* * * * *